United States Patent
Wellhoefer (10) Patent No.: US 9,421,931 B2
(45) Date of Patent: Aug. 23, 2016

(54) DEVICE AND METHOD FOR TRIGGERING A VEHICLE OCCUPANT PROTECTION MEANS, TRIGGERING SYSTEM AND VEHICLE

(75) Inventor: Matthias Marcus Wellhoefer, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 14/123,913

(22) PCT Filed: Apr. 16, 2012

(86) PCT No.: PCT/EP2012/056904
§ 371 (c)(1),
(2), (4) Date: Feb. 28, 2014

(87) PCT Pub. No.: WO2012/171677
PCT Pub. Date: Dec. 20, 2012

(65) Prior Publication Data
US 2014/0200773 A1   Jul. 17, 2014

(30) Foreign Application Priority Data

Jun. 14, 2011   (DE) .................. 10 2011 077 486

(51) Int. Cl.
*B60R 21/01*      (2006.01)
*B60R 21/0136*    (2006.01)
*B60R 21/0134*    (2006.01)

(52) U.S. Cl.
CPC ....... *B60R 21/0136* (2013.01); *B60R 21/0134* (2013.01)

(58) Field of Classification Search
None
See application file for complete search history.

(56) References Cited

U.S. PATENT DOCUMENTS

| 5,508,920 | A | * | 4/1996 | Gioutsos | B60R 21/0132 180/282 |
| 5,558,370 | A | * | 9/1996 | Behr | B60R 21/0132 242/374 |
| 5,785,347 | A | * | 7/1998 | Adolph | B60R 21/01556 180/273 |
| 5,835,007 | A | * | 11/1998 | Kosiak | B60R 21/013 340/436 |
| 5,999,871 | A | * | 12/1999 | Liu | B60R 21/013 280/731 |

(Continued)

FOREIGN PATENT DOCUMENTS

| DE | 102 476 70 | 4/2003 |
| DE | 102 34 624 | 5/2004 |

(Continued)

OTHER PUBLICATIONS

International Search Report for PCT/EP2012/056904, dated Jul. 19, 2012.

*Primary Examiner* — Jonathan M Dager
(74) *Attorney, Agent, or Firm* — Norton Rose Fulbright US LLP (57) ABSTRACT

A device for triggering an occupant protection means of a vehicle has an environment sensor for monitoring a surrounding environment of the vehicle, the environment sensor being adapted so as to output an environment signal in response to an impending collision of the vehicle. The device further has a triggering device that is adapted to acquire, within a peripheral area of the vehicle, a physical quantity indicating a collision that has taken place, and to produce a collision signal based on the physical quantity, and that is adapted to make a triggering decision for the occupant protection means as a function of the environment signal and of the collision signal.

19 Claims, 2 Drawing Sheets

(56) References Cited

U.S. PATENT DOCUMENTS

| | | | | |
|---|---|---|---|---|
| 6,012,008 | A * | 1/2000 | Scully | G01S 13/48 340/903 |
| 6,087,928 | A * | 7/2000 | Kleinberg | B06Q 9/008 340/435 |
| 6,097,332 | A * | 8/2000 | Crosby, II | B60R 21/013 180/271 |
| 6,226,389 | B1 * | 5/2001 | Lemelson | G01S 13/931 382/104 |
| 6,295,495 | B1 * | 9/2001 | Morman | B60R 21/013 340/903 |
| 6,571,161 | B2 * | 5/2003 | Browne | B60R 21/013 280/728.1 |
| 6,708,095 | B2 * | 3/2004 | Prakah-Asante | B60R 21/0132 701/45 |
| 6,721,659 | B2 * | 4/2004 | Stopczynski | B60R 21/013 180/274 |
| 6,915,196 | B2 * | 7/2005 | Rao | B60R 21/013 280/735 |
| 7,140,637 | B2 * | 11/2006 | Roelleke | B60R 21/013 180/274 |
| 7,616,101 | B2 * | 11/2009 | Kuttenberger | G01S 13/931 180/167 |
| 7,712,776 | B2 * | 5/2010 | Prakah-Asante | B60R 21/013 280/735 |
| 8,471,726 | B2 * | 6/2013 | Ekmark | G08G 1/166 340/435 |
| 8,648,613 | B2 * | 2/2014 | Ewerhart | 324/658 |
| 8,851,515 | B2 * | 10/2014 | Fehring | B60N 2/42727 180/274 |
| 8,860,564 | B2 * | 10/2014 | Rubin | G08G 9/02 340/435 |
| 2001/0001522 | A1 * | 5/2001 | Mai | B60N 2/002 280/735 |
| 2004/0030497 | A1 * | 2/2004 | Knoop | B60T 7/042 701/301 |
| 2007/0152803 | A1 * | 7/2007 | Huang | B60Q 1/525 340/435 |
| 2009/0012684 | A1 * | 1/2009 | Thiele | B60T 7/22 701/70 |
| 2009/0076702 | A1 * | 3/2009 | Arbitmann | B60W 10/06 701/96 |
| 2009/0234543 | A1 * | 9/2009 | Groitzsch | B60T 7/22 701/45 |
| 2009/0299576 | A1 * | 12/2009 | Baumann | B60R 21/0134 701/45 |
| 2010/0036565 | A1 * | 2/2010 | Bernzen | B60R 21/013 701/45 |
| 2010/0052884 | A1 * | 3/2010 | Zeppelin | B60W 30/16 340/435 |
| 2010/0063685 | A1 * | 3/2010 | Bullinger | B60R 21/013 701/45 |
| 2010/0094508 | A1 * | 4/2010 | Kozyreff | B60R 21/0134 701/45 |
| 2011/0040452 | A1 * | 2/2011 | Tsunekawa | B60R 21/0134 701/45 |
| 2011/0254330 | A1 * | 10/2011 | Lich | B60N 2/0276 297/216.1 |
| 2013/0147638 | A1 * | 6/2013 | Ricci | G06F 9/54 340/905 |
| 2014/0039786 | A1 * | 2/2014 | Schleicher | B60W 30/09 701/301 |
| 2014/0052355 | A1 * | 2/2014 | Heinrichs-Bartscher | B60T 7/22 701/70 |
| 2014/0156157 | A1 * | 6/2014 | Johnson | B60T 7/22 701/70 |

FOREIGN PATENT DOCUMENTS

| | | |
|---|---|---|
| DE | 103 05 980 | 9/2004 |
| DE | 103 34 699 | 2/2005 |
| DE | 103 55 325 | 6/2005 |
| DE | 10 2005 033937 | 1/2007 |
| DE | 10 2005 035 415 | 2/2007 |
| DE | 10 2010 061 057 | 6/2011 |
| EP | 1 237 758 | 9/2002 |
| JP | 7-117623 | 5/1995 |
| JP | 9-58408 | 3/1997 |
| JP | 2007253720 A | 10/2007 |
| JP | 2009-166687 | 7/2009 |
| JP | 2009-220607 | 10/2009 |

\* cited by examiner

DEVICE AND METHOD FOR TRIGGERING A VEHICLE OCCUPANT PROTECTION MEANS, TRIGGERING SYSTEM AND VEHICLE

CROSS REFERENCE TO RELATED APPLICATION

The present application is the national stage entry of International Patent Application No. PCT/EP2012/056904, filed on Apr. 16, 2012, which claims priority to Application No. DE 10 2011 077 486.6, filed in the Federal Republic of Germany on Jun. 14, 2011.

FIELD OF INVENTION

The present invention relates to a device and method for triggering an occupant protection means of a vehicle, a triggering system for occupant protection means of a vehicle, and a vehicle.

BACKGROUND INFORMATION

Vehicles have a restraint system electronic system that on the one hand is made up of peripheral acceleration or pressure sensors and on the other hand is made up of a central airbag control device that contains at least one two-axis high-g acceleration sensor for central crash recognition. Using such a high-g acceleration sensor, strong accelerations can be detected, such as those that occur during a vehicle collision. Using the high-g acceleration sensor, the control device makes the triggering decision, also taking into account information from the peripheral sensors, typically as plausibility.

SUMMARY

Against this background, the present invention presents a device and method for triggering occupant protection means of a vehicle, a triggering system for occupant protection means of a vehicle, and a vehicle.

The present invention is based on the recognition that a paired group of two sensors situated in the periphery of a vehicle is suitable for making a triggering decision for an occupant protection means of a vehicle. The paired group can autonomously make a plausibilized triggering decision without requiring information from further sensors. After the sensors have been situated in the periphery, the triggering decision can be made very quickly.

The approach according to the present invention is flexible in its use and is suitable for new vehicle structures, vehicle materials, and vehicle shapes. In addition, improved performance, in particular a faster triggering time, is achieved. In this way, the controlling is made more innovative, and newer actuators are enabled. New actuators include for example soft airbags or adaptive structures, i.e., all actuators that require a longer time for their own activation. Moreover, there is an additional cost benefit in the system. In the airbag control device, high-g sensors can be omitted. Instead, low-cost environment sensors can be used that in addition offer a high degree of additional potential for further functions such as parking, lane keeping, distance measurements, and near-field navigation.

The present invention creates a device for triggering an occupant protection means of a vehicle having the following features:

an environment sensor for monitoring a surrounding environment of the vehicle, the environment sensor being adapted so as to output an environment signal to an output of the environment sensor in response to an impending collision of the vehicle;

a connecting line that is connected to the output of the environment sensor; and a triggering device having an input that is connected to the connecting line in order to receive the environment signal, a sensor element that is adapted to acquire, within a peripheral area of the vehicle, a physical quantity that indicates a collision that has taken place and to convert it into a collision signal, a logic unit for making a triggering decision for the occupant protection means as a function of the environment signal and the collision signal, and an output for outputting a triggering signal based on the triggering decision.

The vehicle can be a motor vehicle, in particular a vehicle for conveying persons. The occupant protection means can be a device that, when there is a collision, deploys a protective effect for an occupant of the vehicle. Examples of an occupant protection means include an airbag or a safety belt tensioner. The collision can be an impact of the vehicle with an object, for example a foreign object, a person, or a roadway limitation. The environment can be an area within a field of view of the environment sensor, directly adjoining the vehicle. The environment sensor can be adapted to send out a signal in order to monitor the surrounding environment and to receive a reflection of the signal. The environment sensor can be adapted in order to contactlessly determine a distance between the vehicle and an object situated outside the vehicle. The environment sensor can also be adapted to determine a relative movement between the vehicle and the object. In particular, the environment sensor can be adapted to recognize when the vehicle and the object are approaching one another, and to compare this approach to one or more reference values, and, based thereon, to recognize the impending collision between the vehicle and the object. The environment signal of the environment sensor can include an item of information about the impending collision. The connecting line can be an electric line via which the environment signal can be transmitted to the triggering device. The triggering device can be an assembly made up of a plurality of electric circuits. The sensor element can for example be adapted as a pressure sensor or as an acceleration sensor. Accordingly, the physical quantity can be a pressure, a change in pressure, or an acceleration. The collision that has taken place can cause a pressure increase in a hollow space situated in the periphery of the vehicle, and can cause an acceleration of a structural element situated in the periphery of the vehicle. The sensor element can be adapted to acquire a corresponding pressure increase and, additionally or alternatively, a corresponding acceleration. The collision signal can have an item of information about a value of the physical quantity, about a change of the physical quantity over time, or, if the physical quantity is evaluated by the sensor element, can have an item of information about the collision that has taken place. In some circumstances, the physical quantity can indicate a collision that has taken place although no collision has taken place. For plausibilization, the logic unit can be adapted to link the collision signal with the environment signal. The triggering decision can be made only if both the environment signal and the collision signal indicate a collision. The triggering signal can for example be outputted to a central control device. The triggering signal can be adapted to bring about the actual triggering of the occupant protection means without requiring a further plausibilization. The environment sensor and the triggering device can be situated adjacent to one another so that the collision recognized by the environment sensor can exert an immediate influence on the sensor element of the triggering device after the collision occurs. The environment sensor and the triggering device can both be situated in the periphery of the vehicle. The periphery can be understood as a surrounding lateral edge of the vehicle, for example formed by a lateral, front, or rear body segment of the vehicle.

According to an exemplary embodiment, the logic unit of the triggering device can be adapted so as to use the environment signal as a plausibilization for the collision signal, and to make the triggering decision based on the collision signal. Through the plausibilization, the probability of a false triggering of the occupant protection means can be reduced. Because the plausibilization is based on a signal provided before the occurrence of the collision, the plausibilization is present already at the time of the provision of the collision signal. In this way, when plausibility is present the collision signal can be used directly, without having to wait for a further plausibilization result, for the output of the triggering signal. In this way, the triggering decision can be made very quickly and at the same time very reliably.

The environment sensor can be adapted so as to be situated on an outer shell of the vehicle. For example, the environment sensor can have a fastening element for fastening the environment sensor to, on, or in the outer shell. The environment sensor can also be formed by a sub-area of the outer shell. The outer shell can be a plastic part or a metal part. The triggering device can be adapted so as to be situated on a peripheral structural element of the vehicle covered by the outer shell of the vehicle. The structural element can be a bearing element of the body of the vehicle. The triggering device, and in particular the sensor element, can be rigidly connected to the structural element. Through the situation of both sensors directly on or near the vehicle outer wall involved in the collision, the collision can be recognized very quickly.

The environment sensor can be situated in a first housing and the triggering device can be situated in a separate second housing. The first housing and the second housing can be connected to one another via the connecting line. The housings can be made of plastic. Each of the housings can have an interface, for example a plug, for the electrical and mechanical connection of the connecting line. The housings can have no common housing wall, so that the environment sensor and the triggering device are each self-contained elements. The housings can protect the environment sensor and the triggering device from environmental influences. The housing can also be used for fastening to the vehicle.

The connecting line can be a direct connection between the output of the environment sensor and the input of the triggering device. A direct connection can be a point-to-point connection. The environment signal can be transmitted directly to the triggering device via the direct connection. This can mean that the environment signal is not conducted between the output of the environment sensor and the input of the triggering device via any electrical circuits. In this way, the environment signal can be transmitted to the triggering device very quickly.

The connecting line can have a length of less than 1.25 m. For example, the connecting line can have a length of less than or equal to 100 cm. The length of the connecting line defines a maximum distance between the environment sensor and the triggering circuit. A short connecting line has the effect that the environment sensor and the triggering circuit are situated close to one another. In addition, a short connecting line results in short signal runtimes, so that the environment signal can be transmitted to the triggering device very quickly.

According to an exemplary embodiment, the sensor element of the triggering device can be a pressure sensor or an acceleration sensor. Such sensors have already proven effective as peripheral collision sensors. As an environment sensor, a sensor can be used that is already used for driver assistance systems. The environment signal can thus additionally be transmitted to a driver assistance system, for example a parking assistant. Alternatively, the environment sensor can be adapted in order to produce an additional environment signal and to provide it to the driver assistance system. In this way, one and the same environment sensor can be used for different systems of the vehicle.

In addition, the present invention creates a triggering system for occupant protection means of a vehicle, having the following features:

a first device according to an exemplary embodiment of the present invention for triggering a first occupant protection means;

a further device according to an exemplary embodiment of the present invention for triggering a further occupant protection means; and a control device that is adapted to receive the triggering signal of the first device and the triggering signal of the further device and, in response to the triggering signal of the first device, to activate the first occupant protection means, and, in response to the triggering signal of the further device, to activate the further occupant protection means.

The control device can be adapted to activate the first occupant protection means in response to the first triggering signal of the first device without further plausibilization of the triggering signal. Corresponding to this, the control device can be adapted to activate the further occupant protection means in response to the further triggering signal of the further device without further plausibilization of the further triggering signal. The control device can be based on a conventional airbag control device, no sensor system being required within the control device for the triggering of the first and of the further occupant protection means. The respective triggering decisions can be made based exclusively on the sensor system of the respective device. Thus, it can be that no sensor is situated within a housing of the control device. A triggering signal of one of the devices can be used to trigger a plurality of occupant protection means. The triggering system can also have a multiplicity of devices for triggering a multiplicity of occupant protection means, such that the triggering signals of the multiplicity of devices can be received by the control device and can be used to activate the corresponding multiplicity of occupant protection means. The multiplicity of devices can be situated so as to be distributed laterally around the passenger compartment.

Vehicle, having the following features:

a first occupant protection means and a further occupant protection means; and a triggering system according to an exemplary embodiment of the present invention, the central control device being situated spatially separate from the first device and from the further device.

The first and the further device can be situated at a distance from one another in the vehicle. For example, the devices can be situated on opposite sides of the vehicle. The first occupant protection means can be situated closer to the first device than to the further device. Correspondingly, the further occupant protection means can be situated closer to the further device than to the first device. The control device can be an autonomous element, for example having its own housing, situated at a distance from the devices. For example, the control device can be situated approximately centrically between the devices. The control device can be connected to the devices via connecting lines, and can be connected to the occupant protection means via further connecting lines. Through a suitable situation of a multiplicity of devices in the periphery of the vehicle, an all-around protection can be realized. Such an all-around protection is in particular suitable for new, for example compact, vehicle shapes, for new vehicle structures, as well as for new or novel materials.

A method for triggering an occupant protection means of a vehicle, including the following steps:

monitoring a surrounding environment of the vehicle in order to output an environment signal in response to an impending collision of the vehicle;

acquiring a physical quantity indicating that a collision has taken place within a peripheral area of the vehicle, and converting the physical quantity into a collision signal;

making a triggering decision for the occupant protection means as a function of the environment signal and of the collision signal; and outputting a triggering signal based on the triggering decision.

Through the exemplary embodiments, a graduated, two-part safety shell protection can be realized in the case of a crash that does without integrated high-g acceleration sensor equipment in the airbag control device. In comparison with a triggering decision based on sensors situated in the airbag control device, a higher level of performance is achieved, resulting in faster triggering times.

Exemplary embodiments of the present invention are explained in more detail in the following with reference to the accompanying drawings.

DETAILED DESCRIPTION

In the following description of preferred exemplary embodiments of the present invention, identical or similar reference characters are used for the elements shown in the various Figures having similar functions; repeated description of these elements is omitted.

Figure 1:
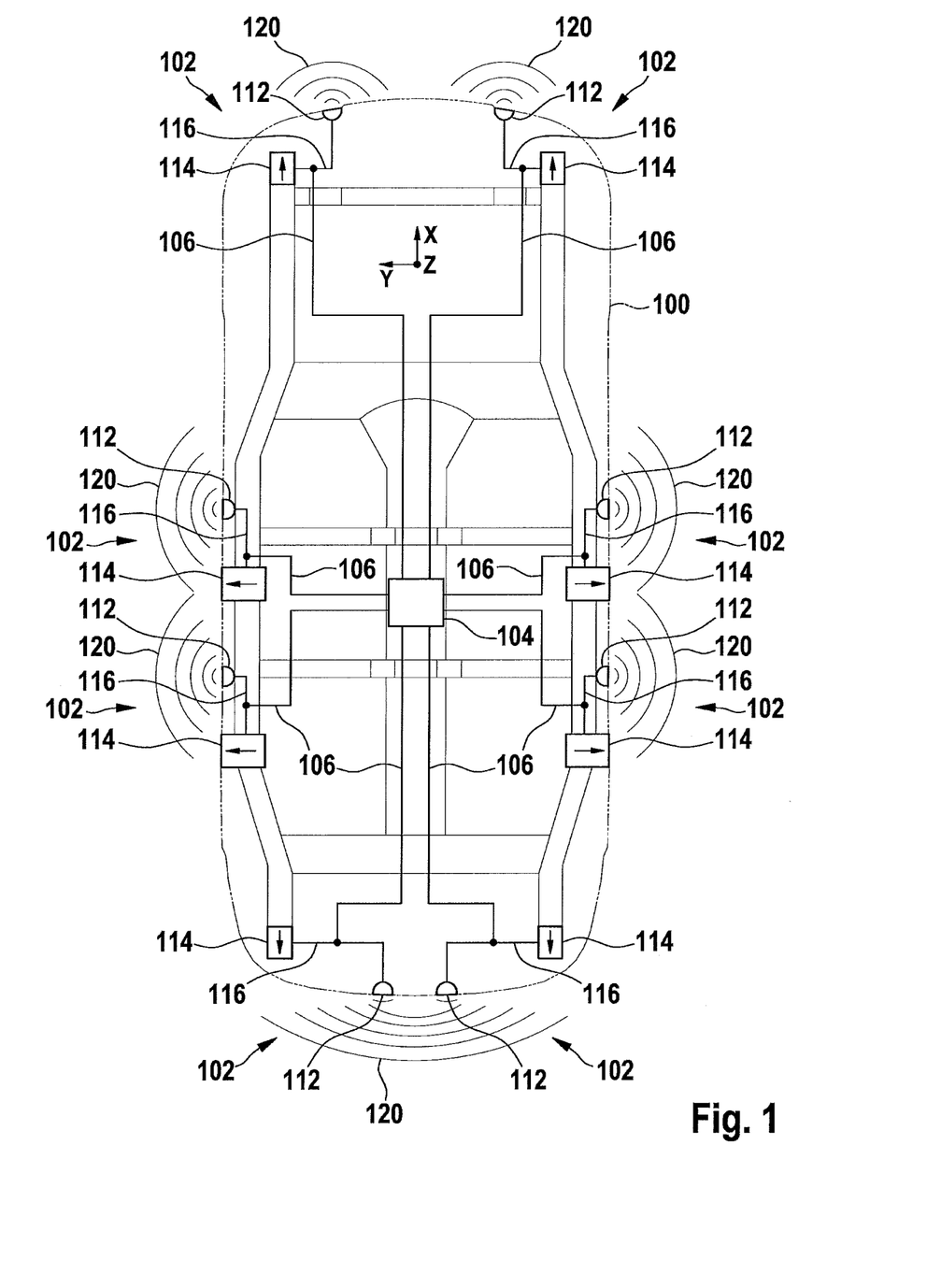
FIG. 1 shows a schematic representation of a vehicle according to an exemplary embodiment of the present invention.

FIG. 1 shows a schematic representation of a vehicle 100 according to an exemplary embodiment of the present invention. Vehicle 100 has a multiplicity of devices 102 for triggering an occupant protection means, and has a control device 104. Each of the devices 102 is connected to control device 104 via an electric line 106. Electric lines 106 can each be realized as a direct connection or as a point-to-point connection between the respective device 102 and control device 104. Alternatively, a plurality of, or all of, the multiplicity of devices 102 can be connected to control device 104 via one or more common lines, or via a bus present in vehicle 100.

Each of the devices has an environment sensor 112, a triggering device 114, and a connecting line 116. According to this exemplary embodiment, environment sensor 112 is realized as a look-ahead plausibility sensor. Environment sensor 112 is situated on the outer edge of vehicle 100, and is adapted to monitor a lateral environment 120 of vehicle 100, adjoining environment sensor 112. Environment sensor 112 is adapted to produce an environment signal and to output it to triggering device 114. According to this exemplary embodiment, triggering device 114 includes a triggering crash sensor or peripheral sensor. Triggering device 114 is situated within an edge area of vehicle 100, and includes a sensor element suitable for recognizing a collision that has taken place. The sensor element is adapted to output a collision signal. Triggering device 114 is further adapted to receive the environment signal of environment sensor 112 and, based on the environment signal and on the collision signal, to produce a triggering signal and to output it to control device 104 via line 106. Control device 104 is adapted to control an occupant protection means of vehicle 100 in response to a triggering signal of one of the devices 102.

According to this exemplary embodiment, vehicle 100 has a multiplicity of devices 102 that are situated in distributed fashion over a front, rear, and lateral peripheral area of vehicle 100. Two devices each are situated in the front area, in the rear area, on the left side wall and on the right side wall of the passenger compartment. The devices can have identical or different environment sensors 112 and identical or different triggering devices 114. For example, some of the triggering devices 114 can have a pressure sensor system, and others of the triggering devices 114 can have an acceleration sensor system.

In the case of devices 102 situated in the front area, triggering device 114 is situated at the height of a longitudinal bearer 131. Environment sensor 112 is situated so as to be offset in the direction of the center of the vehicle, relative to triggering device 114. Triggering device 114 can be fastened on a bearer element of vehicle 100, for example on longitudinal bearer 131 or on a cross-bearer 133. Environment sensor 112 can be fastened on a front bumper of vehicle 100. Environment sensor 112 can be situated on an outer third of a length of the bumper.

In the case of devices 102 situated in the rear area, in each case triggering device 114 is situated at the height of longitudinal bearer 131 and environmental sensor 112 is situated so as to be offset in the direction of the center of the vehicle, relative to triggering device 114. Triggering device 114 can be fastened on a bearer element of vehicle 100, for example on longitudinal bearer 131. Environment sensor 112 can be fastened on a rear bumper of vehicle 100. Environment sensor 112 can be situated on a center third of a length of the bumper.

In the case of laterally situated devices 102, one device 102 can be allocated to a respective door of vehicle 100. Environment sensor 112 can be situated on a door. Triggering device 114 can be situated on the same door as associated environment sensor 112, or can be situated on a body structure adjacent to the door.

According to an exemplary embodiment, vehicle 100 has at least one pair of peripheral sensors, made up of an environment sensor 112 on the outer area of vehicle 100, directly connected to a peripheral crash sensor 114 mounted on the vehicle structure. Environment sensor 112 can be a low-cost sensor. Airbag control device 114 is connected to at least one element 102, and does not have an integrated high-g sensor system. Thus, an airbag control device can be realized that does not have an acceleration sensor for acquiring linear accelerations.

As a crash sensor 114, a so-called peripheral acceleration sensor is suitable, i.e., a remotely situated acceleration sensor that provides the cross-acceleration in the y-direction of vehicle 100. Also suitable as crash sensor 114 is a so-called peripheral pressure sensor, i.e., a pressure sensor that measures the pressure in a hollow space, for example the door. Here, a measurement is carried out of the dynamic change in pressure due to a deformation of a wall of the hollow space during the collision. In addition, a sensing of the absolute pressure can also take place.

The system of devices 102 shown in FIG. 1 creates a peripheral modular sensor system for all-around protection, made up of combined paired groups of a plausibilization sensor 112 and a collision sensor 114. Devices 102 can be attached to a conventional vehicle structure, as is shown in FIG. 1. Directly connected elements 112, 114 are installed partly on the outer shell, namely elements 112, and partly on the vehicle structure, namely elements 114. Elements 112, 114 are fixedly connected, and can autonomously make a firing decision for an irreversible restraint means. The firing command goes to central control device 104, which triggers the actuators of the restraint means in coordinated fashion.

According to the exemplary embodiment shown in FIG. 1, a combination is made of a low-cost environment sensor 112 having a range equal to or less than 10 m and a peripheral pressure or acceleration sensor 114. Environment sensor 112 and peripheral sensor 114 are housed in separate housings, but are connected with a fixed data connection. The fixed data connection has a length equal to or less than 1 m.

The fixed data connection can be realized via two electric lines, for example a two-lead line. In this way, the fixed data connection can be a two-wire interface, for example PSI5 or similar. The fixed data connection can be a current interface or a voltage interface. The data transmission can take place in analog fashion, and preferably can however take place digitally. In the case of a digital current interface, the data can be digitally modulated directly onto a supply voltage via current modulation. In this specific form, the one sensor 112, 114 can directly supply the other, which then sends the data to the supplier via the same line. Thus, peripheral sensor 114 can be adapted to provide a supply voltage for environment sensor 112 via the fixed data connection to environment sensor 112. Alternatively, environment sensor 112 can be adapted to provide a supply voltage for peripheral sensor 114 via the fixed data connection to peripheral sensor 114. In addition to the supply voltage, the data can be exchanged between sensors 112, 114 via the fixed data connection. In order to ensure a reliable and error-resistant data quality, the digital data word should contain a security mechanism such as a parity bit, a CRC, or some other type of redundancy.

Environment sensor 112 can be a one-chip radar or also an optical sensor, e.g., based on LED technology. Environment sensor 112 is attached to the outer shell of vehicle 100 in the front area, side area, or rear area. Crash sensor 114, fixedly connected peripherally, is adapted to acquire pressure or acceleration, and in comparison to environment sensor 112 is attached further in, to the fixed structure of vehicle 100. In the case of front mounting, crash sensor 114 can be fastened in the area of a crash box or of cross-bearer 133 or of longitudinal bearer 131. In the side area, crash sensor 114 can be fastened on the A, B, or C column, or in the door or on a door reinforcement element. In the rear area, crash sensor 114 can be fastened on longitudinal bearer 131 or on the rear bumper.

Each of these paired elements 102 or paired combinations 102 is adapted to autonomously give a firing command for a reversible restraint means, e.g., an airbag. Here, triggering crash sensor 114 is the one connected to the fixed structure of vehicle 100. Crash sensor 114 is adapted to acquire pressure or acceleration. A signal suitable for making a triggering decision is present substantially earlier, in a quantity sufficient for making the triggering decision, at the position of crash sensor 114, in comparison with a central acceleration sensor situated on the transmission tunnel of vehicle 100. This holds quite particularly in the case of new materials and soft front structures, installed for example in order to achieve a savings of weight. The plausibility is present even before the peripheral firing decision, because this decision is given by the approach of the object detected by directly connected environment sensor 112.

A plurality of such sensor pair elements 102 can be attached all around the passenger compartment in the outer area of vehicle 100, depending on the shape, material, and vehicle structure, in the form of a two-shelled protection sensor system. For central coordination and controlling of the restraint means themselves, an airbag control device 104 is installed in the vehicle that is directly connected to all elements 102. This control device receives the firing commands of elements 102, and ignites the restraint means from the battery of vehicle 100 or from its own energy reserve. If airbag control device 104 remains completely without sensors, it can be housed anywhere in the vehicle. In particular, control device 104 can be placed at a location remote from the transmission tunnel of the vehicle.

Nonetheless, positions not situated immediately on the outer area or on a very easily deformable area of vehicle 100 are advantageous in order to prevent control device 104 from being prematurely damaged.

According to an exemplary embodiment, FIG. 1 shows a system that additionally has rollover protection. If vehicle 100 has a rollover sensor system, the rollover sensors are integrated in airbag control device 104. In this case, airbag control device 104 is, as before, placed on the transmission tunnel. A system having a rollover function can therefore be made up of control device 104 with rollover sensors and elements 112, 114, situated in the outer area of vehicle 100 and peripherally distributed around the passenger compartment in a two-part design.

Figure 2:
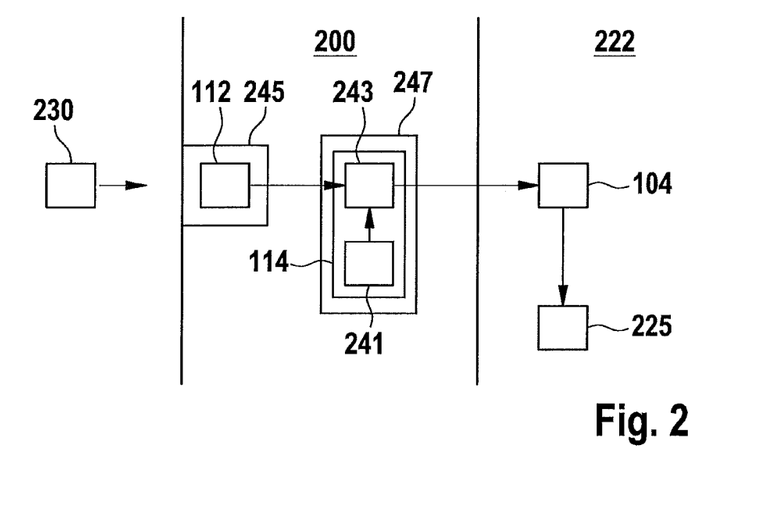
FIG. 2 shows a schematic diagram of a triggering system according to an exemplary embodiment of the present invention.

FIG. 2 shows a schematic diagram of a triggering system according to an exemplary embodiment of the present invention. The triggering system includes an environment sensor 112, a triggering device 114, and a control device 104. Environment sensor 112 and triggering device 114 are situated in a peripheral segment 200 of a vehicle, environment sensor 112 being situated on an outer wall of the peripheral segment. Control device 104 is situated in a center part 222 of the vehicle. Alternatively, control device 104 may also be situated in peripheral segment 200 or in a further peripheral segment. An occupant protection means 225 is situated in a passenger compartment situated in the area of center part 222.

Environment sensor 112 is connected to triggering device 114 via a connecting line 116. Triggering device 114 is connected to control device 104 via a line 106. Control device 104 is connected to occupant protection means 225 via a further line 226.

Environment sensor 112 is adapted to monitor the surrounding environment of the vehicle and to recognize an impending collision of the vehicle with an object 230 situated in the surrounding environment of the vehicle. Environment sensor 112 is further adapted to output, via connecting line 116, an environment signal to triggering device 114. The environment signal has an item of information about the impending collision with object 230. As a function of whether environment sensor 112 has a signal evaluation, the information about the impending collision can be present in evaluated form or as raw data.

Triggering device 114 has an input for receiving the environment signal, a sensor element 241, a logic unit 243, and an output for outputting a triggering signal to line 106. Sensor element 241 is adapted to acquire a collision that has taken place or is currently taking place of the vehicle with object 230. For this purpose, sensor element 241 can be adapted to acquire an acceleration of the vehicle caused by the collision, a change in pressure caused by the collision, or structure-borne sound caused by the collision. Sensor element 241 is adapted to output a collision signal to logic unit 243. The collision signal has an item of information concerning the collision that has taken place with object 230. As a function of whether sensor element 241 has a signal evaluation, the information about the collision that has taken place can be present in evaluated form or as raw data.

Logic unit 243 can include an electrical circuit or can be distributed across a plurality of electrical circuits. Based on the environment signal in the collision signal, logic unit 243 is adapted to make a triggering decision for occupant protection means 225 and to output the triggering signal representing the triggering decision. In order to make the triggering decision, logic unit 243 can be adapted to combine the signals of environment sensor 112 and of sensor element 241 with one another. For example, logic unit 243 can be adapted to implement an AND linkage between the environment signal and the collision signal. Logic unit 243 can also be adapted to output the collision signal as a triggering signal if the environment signal has a specified characteristic such as a specified value. In this case, the specified characteristic would indicate a recognized impending collision. For example, the triggering device can be adapted to output the triggering signal if the collision signal indicates a collision that has taken place within a specified time interval after the environment signal has indicated an impending collision.

Control device 104 is adapted to activate, e.g., to ignite, occupant protection means 225 upon reception of the triggering signal. According to an exemplary embodiment, control device 104 is adapted to carry out no plausibilization of the triggering signal based on further sensor signals. Control device 104 can be adapted to activate occupant protection means 225 immediately after reception of the triggering signal. Alternatively, control device 104 can be adapted to evaluate the triggering signal, for example by a threshold value comparison, and to activate occupant protection means 225 as a function of a result of the evaluation.

According to this exemplary embodiment, environment sensor 112 has a housing 245 and triggering device 114 has a housing 247, housings 245, 247 being situated at a distance from one another. Control device 104 has in turn a separate housing that is situated at a distance from housings 245, 247. In this way, environment sensor 112, triggering device 114, and control device 104 are situated at different positions in the vehicle.

According to an exemplary embodiment, a signal of environment sensor 112 is received and evaluated by a driver assistance system for supporting the driver during driving. Thus, environment sensor 112 can perform a double function.

Figure 3:
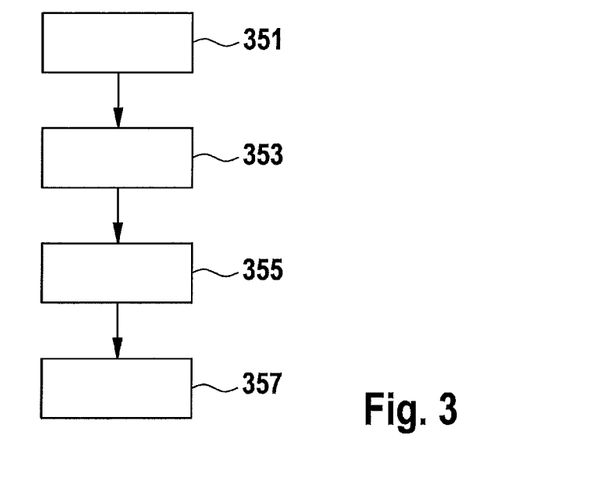
FIG. 3 shows a flow diagram of a method according to an exemplary embodiment of the present invention.

FIG. 3 shows a flow diagram of a method for triggering an occupant protection means of a vehicle according to an exemplary embodiment of the present invention. In a step 351 a surrounding environment of the vehicle, for example of vehicle 100 shown in FIG. 1, is monitored. In a step 353, an impending collision of the vehicle with an object is recognized. In a step 355, a collision that has taken place of the vehicle with the object is acquired. In a step 357, a triggering decision is made for the occupant protection means, as a function of whether the collision that has taken place was acquired and was recognized before the collision was impending.

The described exemplary embodiments shown in the Figures have been selected only as examples. Different exemplary embodiments can be combined with one another completely or with regard to individual features. An exemplary embodiment can also be supplemented by features of a further exemplary embodiment. In addition, method steps according to the present invention can be repeatedly executed both in the described sequence and in a sequence differing therefrom.

What is claimed is:

1. A device for triggering an occupant protection arrangement of a vehicle, comprising:
    an environment sensor for monitoring a surrounding environment of the vehicle, the environment sensor being adapted to output an environment signal to an output of the environment sensor in response to an impending collision of the vehicle;
    a connecting line connected to the output of the environment sensor;
    a triggering device having an input that is connected to the connecting line for reception of the environment signal, a sensor element adapted to acquire, within a peripheral area of the vehicle, a physical quantity indicating that a collision has taken place and, based on the physical quantity, to produce a collision signal, a logic unit for making a triggering decision for the occupant protection arrangement as a function of the environment signal and of the collision signal, and an output for outputting a triggering signal based on the triggering decision;
    and
    a control device to receive the triggering signal of the triggering device to activate the occupant protection arrangement in response to the triggering signal of the triggering device;
    wherein the connecting line is a direct connection between the output of the environment sensor and the input of the triggering device,
    wherein the environment sensor and the triggering device are situated adjacent to one another within the peripheral area of the vehicle, and
    wherein the triggering signal of the triggering device is adapted to activate the occupant protection arrangement.

2. The device according to claim 1, wherein the logic unit of the triggering device is adapted to use the environment signal as plausibilization for the collision signal, and to make the triggering decision based on the collision signal.

3. The device according to claim 1, wherein the environment sensor is situated in a first housing, and the triggering device is situated in a separate, second housing, the first housing and the second housing being connected to one another via the connecting line.

4. The device according to claim 1, wherein the connecting line has a length of less than 1.25 m.

5. The device according to claim 1, wherein the sensor element of the triggering device is a pressure sensor or an acceleration sensor.

6. A triggering system for an occupant protection arrangement of a vehicle, comprising:
  a first device for triggering a first occupant protection arrangement;
  a further device for triggering a further occupant protection arrangement; and
  a control device that is adapted to receive the triggering signal of the first device and the triggering signal of the further device and to activate the first occupant protection arrangement in response to the triggering signal of the first device, and to activate the further occupant protection arrangement in response to the triggering signal of the further device;
  wherein the first device and the further device each include:
    an environment sensor for monitoring a surrounding environment of the vehicle, the environment sensor being adapted to output an environment signal to an output of the environment sensor in response to an impending collision of the vehicle;
    a connecting line connected to the output of the environment sensor; and
    a triggering device having an input that is connected to the connecting line for reception of the environment signal, a sensor element adapted to acquire, within a peripheral area of the vehicle, a physical quantity indicating that a collision has taken place and, based on the physical quantity, to produce a collision signal, a logic unit for making a triggering decision for the occupant protection arrangement as a function of the environment signal and of the collision signal, and an output for outputting a triggering signal based on the triggering decision;
    wherein the environment sensor is adapted to be situated on an outer shell of the vehicle, and the triggering device is adapted to be situated on a peripheral structural element of the vehicle covered by the outer shell of the vehicle.

7. A vehicle, comprising:
  a first occupant protection arrangement and a further occupant protection arrangement; and
  a triggering system having a control device which is situated spatially separate from a first device and from a further device;
  wherein the triggering system includes:
  the first device for triggering the first occupant protection arrangement;
  the further device for triggering the further occupant protection arrangement; and
  the control device, which is adapted to receive the triggering signal of the first device and the triggering signal of the further device and to activate the first occupant protection arrangement in response to the triggering signal of the first device, and to activate the further occupant protection arrangement in response to the triggering signal of the further device;
  wherein the first device and the further device each include:
    an environment sensor for monitoring a surrounding environment of the vehicle, the environment sensor being adapted to output an environment signal to an output of the environment sensor in response to an impending collision of the vehicle;
    a connecting line connected to the output of the environment sensor; and
    a triggering device having an input that is connected to the connecting line for reception of the environment signal, a sensor element adapted to acquire, within a peripheral area of the vehicle, a physical quantity indicating that a collision has taken place and, based on the physical quantity, to produce a collision signal, a logic unit for making a triggering decision for the occupant protection arrangement as a function of the environment signal and of the collision signal, and an output for outputting a triggering signal based on the triggering decision;
    wherein the environment sensor is adapted to be situated on an outer shell of the vehicle, and wherein the triggering device is adapted to be situated on a peripheral structural element of the vehicle covered by the outer shell of the vehicle.

8. A method for triggering an occupant protection arrangement of a vehicle, comprising:
  using an environment sensor, monitoring a surrounding environment of the vehicle to output an environment signal in response to an impending collision of the vehicle;
  using another sensor element situated on a triggering device acquiring a physical quantity indicating a collision that has taken place within a peripheral area of the vehicle, and producing a collision signal based on the physical quantity;
  using the triggering device making a triggering decision for the occupant protection arrangement as a function of the environment signal and the collision signal;
  outputting a triggering signal based on the triggering decision, wherein using a connecting line, the triggering device is directly connected to the environment sensor; and
  receiving, using a control unit, the triggering signal of the triggering device to activate the occupant protection arrangement in response to the triggering signal of the triggering device;
  wherein the environment sensor and the triggering device are situated adjacent to one another within the peripheral area of the vehicle, and
  wherein the triggering signal of the triggering device is adapted to activate the occupant protection arrangement.

9. The device according to claim 1, wherein the logic unit of the triggering device is adapted to use the environment signal as plausibilization for the collision signal, and to make the triggering decision based on the collision signal, and wherein the environment sensor is situated in a first housing, and the triggering device is situated in a separate, second housing, the first housing and the second housing being connected to one another via the connecting line.

10. The device according to claim 9, wherein the connecting line has a length of less than 1.25 m.

11. The device according to claim 10, wherein the sensor element of the triggering device is a pressure sensor or an acceleration sensor.

12. The device according to claim 9, wherein the sensor element of the triggering device is a pressure sensor or an acceleration sensor.

13. The vehicle according to claim 7, wherein the logic unit of the triggering device is adapted to use the environment signal as plausibilization for the collision signal, and to make the triggering decision based on the collision signal.

14. The vehicle according to claim 7, wherein the environment sensor is situated in a first housing, and the triggering device is situated in a separate, second housing, the first housing and the second housing being connected to one another via the connecting line.

15. The vehicle according to claim 7, wherein the connecting line has a length of less than 1.25 m.

16. The vehicle according to claim 7, wherein the sensor element of the triggering device is a pressure sensor or an acceleration sensor.

17. The triggering system according to claim 6, wherein the logic unit of the triggering device is adapted to use the environment signal as plausibilization for the collision signal, and to make the triggering decision based on the collision signal.

18. The triggering system according to claim 6, wherein the environment sensor is situated in a first housing, and the triggering device is situated in a separate, second housing, the first housing and the second housing being connected to one another via the connecting line.

19. The triggering system according to claim 6, wherein the sensor element of the triggering device is a pressure sensor or an acceleration sensor.

* * * * *